United States Patent

Fujita et al.

[11] Patent Number: 6,070,800
[45] Date of Patent: Jun. 6, 2000

[54] BAR CODE IMAGE PROCESSING APPARATUS CAPABLE OF IDENTIFYING POSITION AND DIRECTION OF A BAR CODE

[75] Inventors: Mikio Fujita, Yokohama; Atsuharu Yamamoto, Kawasaki; Toyoki Kawahara, Kawasaki; Kuinio Yoshida, Kawasaki; Toru Asano, Sagamihara; Shigeo Komizo, Tokyo, all of Japan

[73] Assignee: Matsushita Electric Industrial Co., Ltd., Osaka, Japan

[21] Appl. No.: 08/987,110

[22] Filed: Dec. 8, 1997

[30] Foreign Application Priority Data

Dec. 10, 1996 [JP] Japan ................... 8-329335

[51] Int. Cl.[7] ............ G06K 7/10; G06K 15/12; G02B 7/08
[52] U.S. Cl. ................. 235/462.11; 235/462.1; 235/462.24; 235/462.41
[58] Field of Search ............ 235/462.08, 462.09, 235/462.1, 462.11, 462.24, 462.41

[56] References Cited

U.S. PATENT DOCUMENTS

| | | | |
|---|---|---|---|
| 5,126,544 | 6/1992 | Izumi | 235/462 |
| 5,134,272 | 7/1992 | Tsuchiya et al. | 235/462 |
| 5,418,862 | 5/1995 | Zheng et al. | 382/199 |
| 5,524,068 | 6/1996 | Kacandes et al. | 382/258 |
| 5,557,091 | 9/1996 | Krummel | 235/462 |
| 5,574,272 | 11/1996 | Seo et al. | 235/454 |
| 5,663,552 | 9/1997 | Komizo | 235/472 |
| 5,742,037 | 4/1998 | Scola et al. | 235/454 |
| 5,754,670 | 5/1998 | Shin et al. | 382/56 |
| 5,867,594 | 2/1999 | Cymbalski | 382/192 |
| 5,867,595 | 2/1999 | Cymbalski | 382/192 |

FOREIGN PATENT DOCUMENTS 2-125386  5/1990  Japan .

*Primary Examiner*—Donald Hajec
*Assistant Examiner*—Douglas X. Rodriguez
*Attorney, Agent, or Firm*—Lowe Hauptman Gopstein Gilman & Berner

[57] ABSTRACT

An image input section enters a document image including a bar code, and converts the document image into a binary image. An image memory section memorizes the binary image supplied from the image input section. A mask judging section performs a scanning operation using an M×M pixel window for detecting an alternate pattern from the binary image supplied from the image input section. A small pattern removing section removes small patterns from a binary image sent from the mask judging section. An expanding section expands a pattern involved in a binary image by an amount equivalent to k1 pixels when this binary image is sent from the small pattern removing section. A contracting section contracts a pattern involved in a binary image by an amount equivalent to k2 pixels when this binary image is sent from the expanding section. A region detecting section obtains the feature quantity of each pattern involved in a binary image sent from the contracting section, and detects a bar code candidate region based on the detected feature quantity. And, a decoding section decodes a detected bar code by reading a specific image region from the image memory section when the specific image region corresponds to the bar code candidate region detected by the region detecting section.

6 Claims, 15 Drawing Sheets

MAIN
→ SCANNING

SUB SCANNING ↓

| d4 | d3 | d2 |
|----|----|----|
| d5 | d0 | d1 |
| d6 | d7 | d8 |

| 0 | 0 | 0 |
|---|---|---|
| 0 | 1 | 0 |
| 0 | 0 | 0 |

| 0 | 0 | 0 |
|---|---|---|
| 0 | 1 | 0 |
| 1 | 1 | 1 |

| 1 | 1 | 1 |
|---|---|---|
| 1 | 0 | 1 |
| 1 | 1 | 1 |

FIG. 8

| REGION NUMBER | SUM X | SUM Y | s | xg | yg |
|---|---|---|---|---|---|
| 1 | X(1) | Y(1) | s(1) | xg(1) | yg(1) |
| 2 | X(2) | Y(2) | s(2) | xg(2) | yg(2) |
| ⋮ | ⋮ | ⋮ | ⋮ | ⋮ | ⋮ |
| i | X(i) | Y(i) | s(i) | xg(i) | yg(i) |
| ⋮ | ⋮ | ⋮ | ⋮ | ⋮ | ⋮ |

FIG. 11

| REGION NUMBER | SUM X | SUM Y | s | xg | yg | VALID FLAG |
|---|---|---|---|---|---|---|
| 1 | X(1) | Y(1) | s(1) | xg(1) | yg(1) | 1 |
| 2 | X(2) | Y(2) | s(2) | xg(2) | yg(2) | 1 |
| ⋮ | ⋮ | ⋮ | ⋮ | ⋮ | ⋮ | ⋮ |
| i | X(i) | Y(i) | s(i) | xg(i) | yg(i) | 1 |
| ⋮ | ⋮ | ⋮ | ⋮ | ⋮ | ⋮ | ⋮ |

FIG. 12

| ITEM | CONTENT |
|---|---|
| i | SERIAL GROUP NUMBER |
| bar-flag | FLAG INDICATING A BAR CODE CANDIDATE REGION CANDIDATE [1] NON-CANDIDATE [0] |
| member | TOTAL NUMBER OF ISLET REGIONS INVOLVED IN A GROUP |
| x [0]<br>y [0]<br>s [0]<br>bar [0] | X COORDINATE OF ISLET REGION'S CENTER-OF-GRAVITY<br>Y COORDINATE OF ISLET REGION'S CENTER-OF-GRAVITY<br>AREA OF ISLET REGION<br>TYPE OF BAR |
| x [1]<br>y [1]<br>s [1]<br>bar [1] | X COORDINATE OF ISLET REGION'S CENTER-OF-GRAVITY<br>Y COORDINATE OF ISLET REGION'S CENTER-OF-GRAVITY<br>AREA OF ISLET REGION<br>TYPE OF BAR |
| ....... | |
| x [member-1]<br>y [member-1]<br>s [member-1]<br>bar [member-1] | X COORDINATE OF ISLET REGION'S CENTER-OF-GRAVITY<br>Y COORDINATE OF ISLET REGION'S CENTER-OF-GRAVITY<br>AREA OF ISLET REGION<br>TYPE OF BAR |

6,070,800

BAR CODE IMAGE PROCESSING APPARATUS CAPABLE OF IDENTIFYING POSITION AND DIRECTION OF A BAR CODE

BACKGROUND OF THE INVENTION

1. Field of the Invention

The present invention relates to a bar code image processing apparatus which is capable of identifying the position and the direction of a bar code when reading and decoding a bar code from a document (e.g., mail) image including letters, figures and patterns.

2. Prior Art

Bar codes are widely used for many purposes in various fields. FIG. 17 shows a conventional bar code reading technique, disclosed in Unexamined Japanese Patent Application No. 2-125386 (published in 1990), which enters a two-dimensional image of an object, extracts each bar code region involved in the entered image through an image processing, and decodes a bar code.

More specifically, in an image processing arrangement shown in FIG. 17, image data are entered through an input terminal 901 into a binary coding section 903 in which the entered image data are changed into binary data. A binary level variation detecting section 904 converts the binary data into a contour image. A black expanding section 905 unites the periodically aligned contour lines of the bar code and paints out the bar code region. Next, a black contracting section 906 erases the background and extracts the bar code region. Numeral 907 represents a regressive straight line calculating section, numeral 908 represents a reading coordinate calculating section, numeral 902 represents an image signal memory section, and reference numeral 909 represents a bar code decoding section. Thus, along a regressive straight line of the extracted region, the image data are read and decoded.

However, according to the above-described conventional bar code image processing apparatus, it is difficult to correctly separate the bar code region from the background image when the length of a bar is short in comparison with a bar pitch.

SUMMARY OF THE INVENTION

In view of the foregoing, a principal object of the present invention is to provide a reliable bar code image processing apparatus which is capable of accurately detecting and decoding a bar code region regardless of the position and the direction of the bar code.

In order to accomplish the above-described and other related objects, the present invention provides an excellent and reliable bar code image processing apparatus characterized by the following features. An image input means enters a document image including a bar code, and converts the document image into a binary image. An image memory means memorizes the binary image supplied from the image input means. A mask judging means performs a scanning operation using an M×M pixel window for detecting an alternate pattern from the binary image supplied from the image input means. A small pattern removing means removes small patterns from a binary image sent from the mask judging means. An expanding means expands a pattern involved in a binary image by an amount equivalent to k1 pixels when this binary image is sent from the small pattern removing means. A contracting means contracts a pattern involved in a binary image by an amount equivalent to k2 pixels when this binary image is sent from the expanding means. A region detecting means obtains the feature quantity of each pattern involved in a binary image sent from the contracting means, and detects a bar code candidate region based on the detected feature quantity. And, a decoding means decodes a detected bar code by reading a specific image region from the image memory means when the specific image region corresponds to the bar code candidate region detected by the region detecting means.

Preferably, the mask judging means produces a bar code detecting signal when any alternate pattern is detected during a scanning operation performed along a plurality of scanning lines angularly arranged at regular intervals of $(360/m)°$ about a center pixel of the M×M pixel window.

Preferably, the mask judging means determines an output value by entering an address consisting of predetermined pixels within the M×M pixel window into a look-up table means, and the look-up table means learns and registers all of bit patterns appearing on the predetermined pixels when an objective bar code is scanned one pixel by one pixel.

Preferably, the region detecting means detects the bar code candidate region based on the feature quantity including an area, a peripheral length, or a circumscribed rectangle.

Preferably, the decoding means performs a decoding operation based on an area and a center-of-gravity position of each bar.

Preferably, the bar code is a 4-state code including a long bar, a semi-long bar and a timing bar.

Preferably, the decoding means discriminates each pattern by putting a label, identifies a bar type among the long bar, the semi-long bar and the timing bar based on an area of each pattern, obtains a line passing center-of-gravity positions of the long and timing bars, detects a phase relationship of the semi-long bar with respect to the obtained line, and decodes the bar code based on the obtained phase relationship.

BRIEF DESCRIPTION OF THE DRAWINGS

The above and other objects, features and advantages of the present invention will become more apparent from the following detailed description which is to be read in conjunction with the accompanying drawings, in which:

FIG. 8 is a feature quantity table which is used to register the feature quantity of each region labeled by the labeling section in the region detecting section of the bar code image processing apparatus in accordance with the first embodiment of the present invention;

FIG. 11 is a feature quantity table which is used to register the feature quantity of an original image labeled by the decoding section of the bar code image processing apparatus in accordance with the first embodiment of the present invention;

FIG. 12 is a group table which is used to register the feature quantity of each islet region grouped by the decoding section of the bar code image processing apparatus in accordance with the first embodiment of the present invention;

DESCRIPTION OF THE PREFERRED EMBODIMENTS

Figure 1:
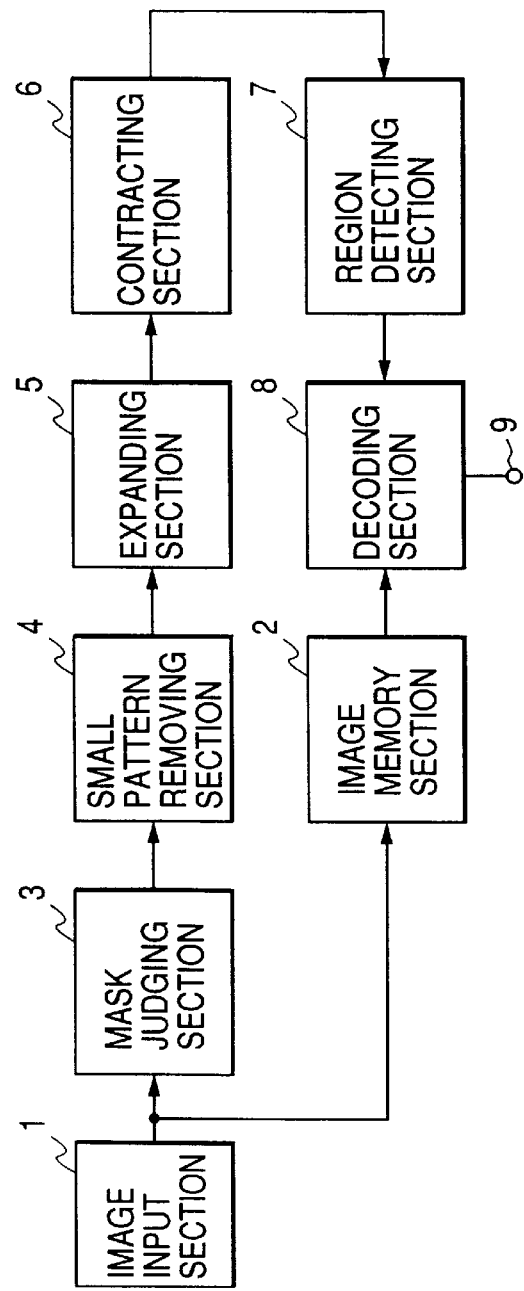
FIG. 1 is a block diagram showing an arrangement of a bar code image processing apparatus in accordance with a first embodiment of the present invention.

Preferred embodiments of the present invention will be explained with reference to the accompanying drawing. Identical parts are denoted by the same reference numerals throughout the drawing.

First Embodiment

Figure 2:
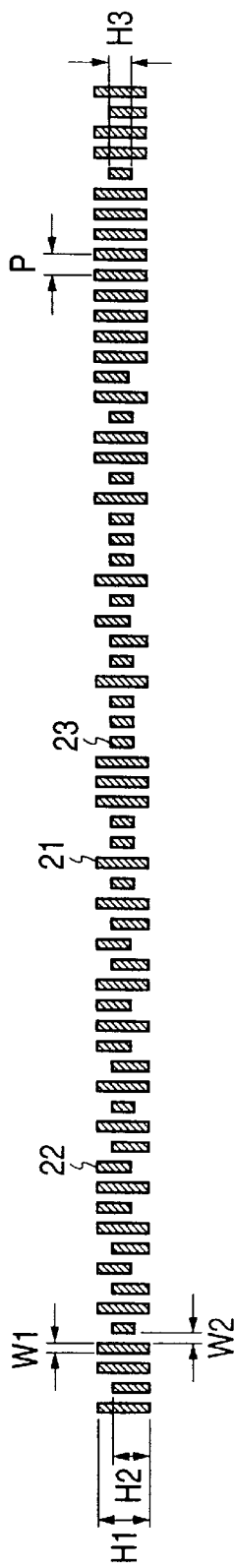
FIG. 2 is a view showing a bar code as an object to be read by the bar code image processing apparatus in accordance with the first embodiment of the present invention.

FIG. 1 is a block diagram showing an arrangement of a bar code image processing apparatus in accordance with a first embodiment of the present invention. In FIG. 1, numeral 1 represents an image input section which reads a document including a bar code and produces a binary image of the read image. The image input section 1 is connected to an image memory section 2 which memorizes the binary image sent from the image input section 1. The image input section 1 is further connected to a mask judging section 3 which performs a scanning operation using an M×M pixel window for detecting an alternate pattern from the binary image. The mask judging section 3 is connected to a small pattern removing section 4 which removes small patterns from the binary image produced from the mask judging section 3. The small pattern removing section 4 is connected to an expanding section 5 which expands a pattern involved in a binary image by k1 pixels when the binary image is sent from the small pattern removing section 4. The expanding section 5 is connected to a contracting section 6 which contracts a pattern involved in a binary image by k2 pixels when the binary image is sent from the expanding section 5. The contracting section 6 is connected to a region detecting section 7 which extracts each pattern involved in the binary image sent from the contracting section 6 and obtains the feature quantity of each extracted pattern. The detected feature quantity is used for detecting a bar code candidate region. The region detecting section 7 is connected to a decoding section 8. The image memory section 2 is connected to the decoding section 8, too. An image region, corresponding to the bar code candidate region detected by the region detecting section 7, is read out from the image memory section 2 by the decoding section 8. Thus, the decoding section 8 decodes the bar code by retrieving an appropriate image region from the image memory region 2 as corresponding to the bar code candidate region detected by the region detecting section 7. Numeral 9 represents an output terminal. The bar code decoded by the decoding section 8 is output from the output terminal 9 and used for sorting or classification for various purposes An operation of the above-described bar code image processing apparatus will be explained hereinafter. A document including a bar code is read by the image input section 1. The image input section 1 produces a binary image including bars valued by 1 and the background valued by 0. According to the first embodiment of the present invention, an image scanner reads the document at a scanning line density of approximately 8 lines/mm. The image scanner is equipped with a CCD line sensor for inputting the image. As shown in FIG. 2, the input image comprises various kinds of bars, such as a long bar 21, a semi-long bar 22 and a timing bar 23, which are preferably used as a mail bar (4-state) code including address information. Each bar has the following size (actual size in parenthesis). A long bar length "H1" is 29 pixels (3.6 mm). A semi-long bar length "H2" is 19 pixels (2.4 mm). A timing bar length "H3" is 10 pixels (1.2 mm). A bar width "W1" is 5 pixels (0.6 mm). A bar space "W2" is 5 pixels (0.6 mm). And, a pitch "P" is 10 pixels (1.2 mm).

The binary-coding operation of the first embodiment is performed in the following manner. A pre-scanning operation using a fixed threshold is performed to obtain a density histogram of a given document. Then, referring to the obtained density histogram, an appropriate threshold is selected to discriminate the pattern and the background. The selected threshold is located between a peak of the pattern and a peak of the background. Then, using the selected threshold, the input image is binary-encoded. The binary image thus obtained is memorized in the image memory section 2 and is also sent to the mask judging section 3.

Figure 3:
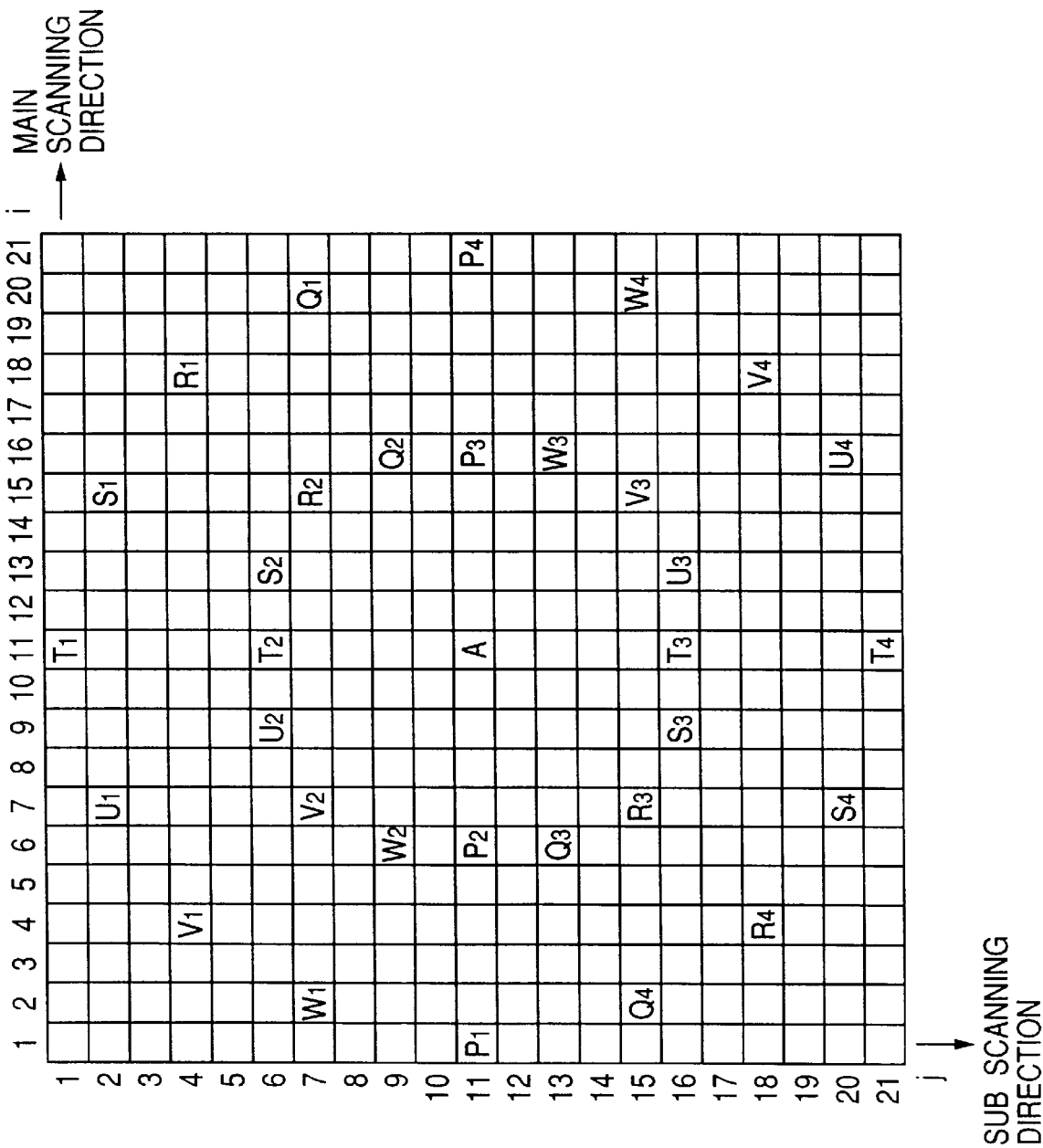
FIG. 3 is a view showing an M×M pixel scanning window used in a mask judging section of the bar code image processing apparatus in accordance with the first embodiment of the present invention.

Next, the mask judging section 3 will be explained in greater detail with reference to FIG. 3. FIG. 3 shows a scanning window of M×M pixels used in the mask judging section 3. The first embodiment of the present invention uses a square scanning window having vertical and lateral sides of 21 pixels (i.e., M=21). In FIG. 3, a concerned pixel "A" is placed at the center of the scanning window. A total of eight groups of detectors P1–P4, Q1–Q4, R1–R4, S1–S4, T1–T4, U1–U4, V1–V4, and W1–W4 are arranged symmetrically around the concerned pixel "A." More specifically, four detectors (e.g., P1, P2, P3, P4) belonging to the same group are aligned along a straight line passing the center (i.e., pixel "A") of the scanning window and symmetrically located about the center (i.e., pixel "A"). The eight groups of detectors are angularly offset or spaced from one another about the center (i.e., pixel "A") at the regular intervals of 180°/8. Using this M×M scanning window, a raster scanning operation is performed on the input binary image. When the pixel value at each detector satisfies the following conditions (1) and (2), the mask judging section 3 produces 1 as an output otherwise produces 0.

(A=1) and {(P1=P4=1, P2=P3=0) or (Q1=Q4=1, Q2=Q3=0) or (R1=R4=1, R2=R3=0) or (S1=S4=1, S2=S3=0) or (T1=T4=1, T2=T3=0) or (U1=U4=1, U2=U3=0) or (V1=V4=1, V2=V3=0) or (W1=W4=1, W2=W3=0)}  (1)

(A=0) and {(P1=P4=0, P2=P3=1) or (Q1=Q4=0, Q2=Q3=1) or (R1=R4=0, R2=R3=1) or (S1=S4=0, S2=S3=1) or (T1=T4=0, T2=T3=1) or (U1=U4=0, U2=U3=1) or (V1=V4=0, V2=V3=1) or (W1=W4=0, W2=W3=1)}  (2)

The above-described conditions (1) and (2) are respectively used to detect an alternate pattern of a bar code at every direction. The condition (1) detects the center line of a bar, while the condition (2) detects the center line of a space. An output image processed by the above-described conditions (1) and (2) will comprise a bar pattern representing a bar code. The detected bar pattern includes bars aligned at pitches of P/2. The above-described conditions (1) and (2) may detect a noise pattern of the background (e.g, letters and figures). However, such a noise pattern is not a concentrated pattern and differs from the bar pattern. Thus, the many of noise patterns derived from the letters and figures of the background can be removed though the above-described processing.

Figures 4A, 4B, 4C, 4D, 5:
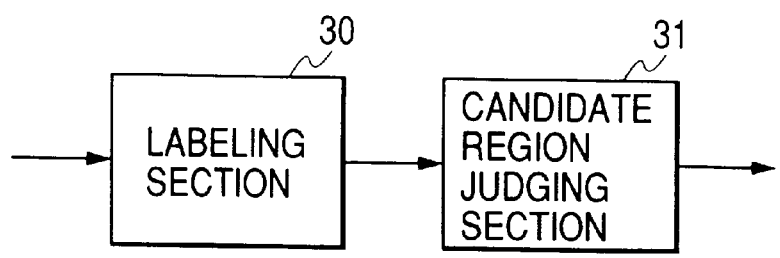
FIGS. 4A to 4D are views showing a judgement mask used in a small pattern removing section of the bar code image processing apparatus in accordance with the first embodiment of the present invention.
FIG. 5 is a block diagram showing an arrangement of a region detecting section of the bar code image processing apparatus in accordance with the first embodiment of the present invention.

Next, the small pattern removing section 4 will be explained with reference to FIGS. 4A to 4D. FIGS. 4A to 4D show examples of a judgement mask of 3×3 pixels used when small patterns are removed. FIG. 4A defines each pixel of the 3×3 judgement mask. FIG. 4B shows an isolated point. FIG. 4C shows a peripheral notch of a pattern. FIG. 4D shows a hole in a pattern. Regarding details of the processing performed in the small pattern removing section 4, a value 0 is output to a central pixel position with respect to each of FIGS. 4B and 4C, while a value 1 is output with respect to FIG. 4D. Namely, the binary image is raster scanned by the 3×3 pixel window. A conversion value for the concerned pixel is obtained based on the bit pattern of the concerned pixel and its peripheral 8 pixels. This processing is realized by a window scanning using a line buffer and a shift register and a pattern judgement using a look-up table (LUT). This is a generally well-known technique, therefore no further explanation will be required.

According to the first embodiment of the present invention, the window scanning is repeated four times to convert the image. The value for the concerned pixel is converted from 1 to 0 in an odd-number processing and converted from 0 to 1 in an even-number processing. FIGS. 4A–4D merely show representative conversion pattern examples. Actual processing is performed in the following manner.

The value for the concerned pixel is converted with respect to a pattern determined by the following conditions (3) and (4).

(d0=1) and $$\left( \sum_{i=1}^{8} di > 4 \right) \quad (3)$$

The condition (3) is applied to a pattern converted in the odd-number scanning.

(d0=0) and $$\left( \sum_{i=1}^{8} di \leq 4 \right) \quad (4)$$

The condition (4) is applied to a pattern converted in the even-number scanning.

By performing the above-described small pattern removing operation, any isolated pattern within two or thee pixels is removed. Thus, it becomes possible to remove noise patterns other than the bar code region.

Next, the expanding section 5 will be explained. The expanding section 5 performs predetermined expansion processing which is applied to the binary image sent from the small pattern removing section 4. The function of this expanding section 5 is to paint out the periodical region constituted by the bar pattern including bars and spaces. According to the first embodiment of the present invention, a performed expansion is equivalent to 5×5 pixels which is required to eliminate any clearance of 2 to 3 pixels existing in the bar pattern including the bars and spaces. More specifically, the binary image produced from the small pattern removing section 4 is scanned by using a 5×5 pixel window. A logic OR of all pixel values is obtained in the window including the concerned pixel (i.e., the central pixel of the window). Then, the bar code region is painted out.

Next, the contracting section 6 will be explained. The contracting section 6 performs predetermined contraction processing which is applied to the binary image sent from the expanding section 5. The function of this contracting section 6 is to extract a skeleton of the bar code region and erase the background pattern. According to the first embodiment of the present invention, a series of processing performed in the mask judging section 3, the small pattern removing section 4 and the expanding section 5 will produce a converted bar code region. The length of the thinnest portion of the converted bar code region is equivalent to 10 pixels. Accordingly, to extract a connected skeleton, the contraction processing of 9×9 pixels is performed. More specifically, the binary image sent from the expanding section 5 is scanned by using a 9×9 pixel window. A logic AND of all pixel values is obtained in the window including the concerned pixel (i.e., the center pixel of the window). Thus, the pattern as a whole is contracted.

Next, the region detecting section 7 will be explained. FIG. 5 is a block diagram showing an arrangement of the region detecting section 7 which comprises a labeling section 30 and a candidate region judging section 31. The labeling section 30 performs a labeling operation applied to the binary image sent from the contracting section 6, and notifies the feature quantity of each labeled region. The candidate region judging section 31 judges a bar code candidate region based on the feature quantity obtained by the labeling section 30. The region detecting section 7, comprising the labeling section 30 and the candidate region judging section 31, is functionally realized by using a well-known microcomputer equipped with CPU.

Figure 6:
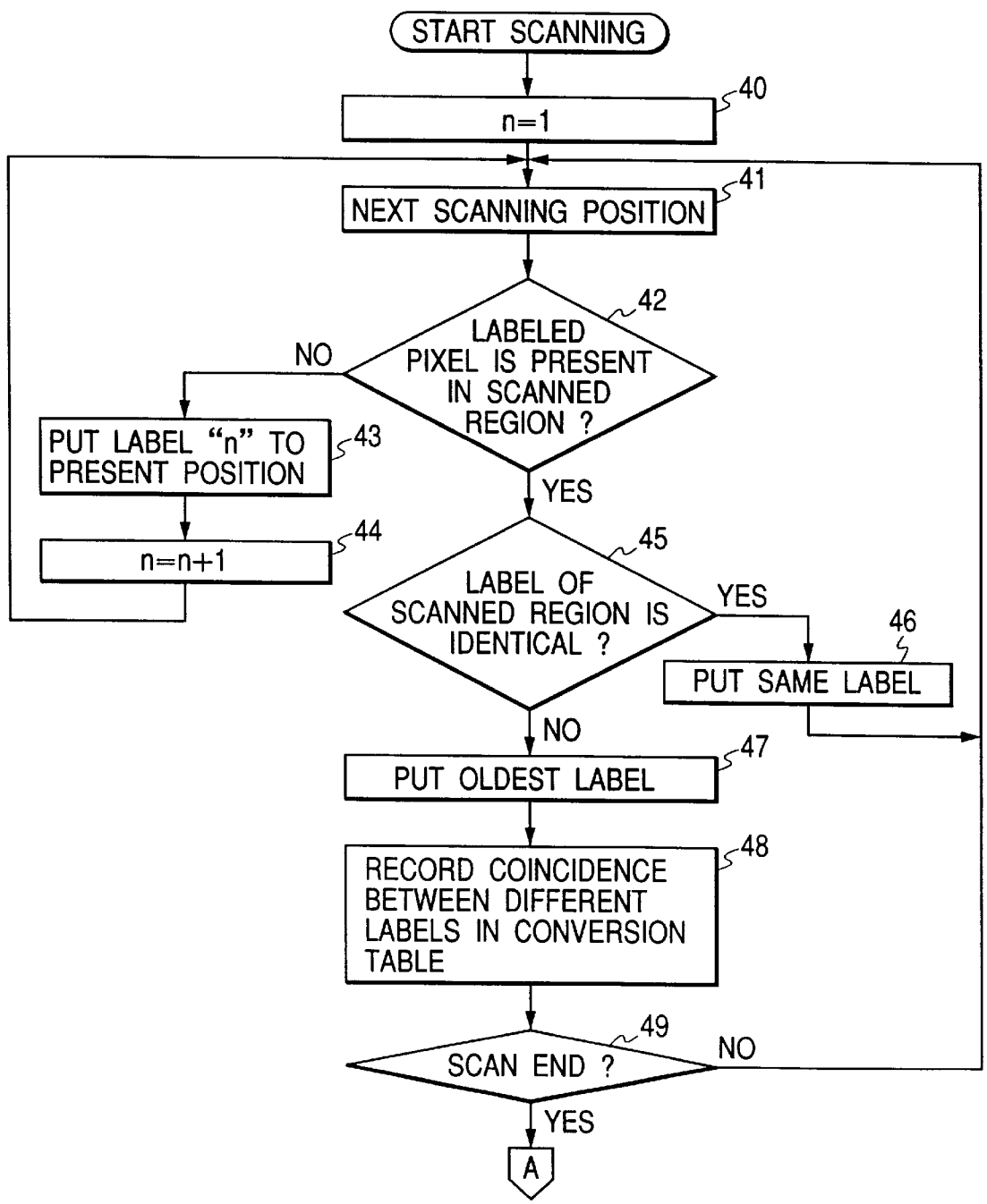
FIGS. 6 and 7 are flowcharts collectively showing a provisional labeling procedure performed by a labeling section in the region detecting section of the bar code image processing apparatus in accordance with the first embodiment of the present invention.
Figure 7:
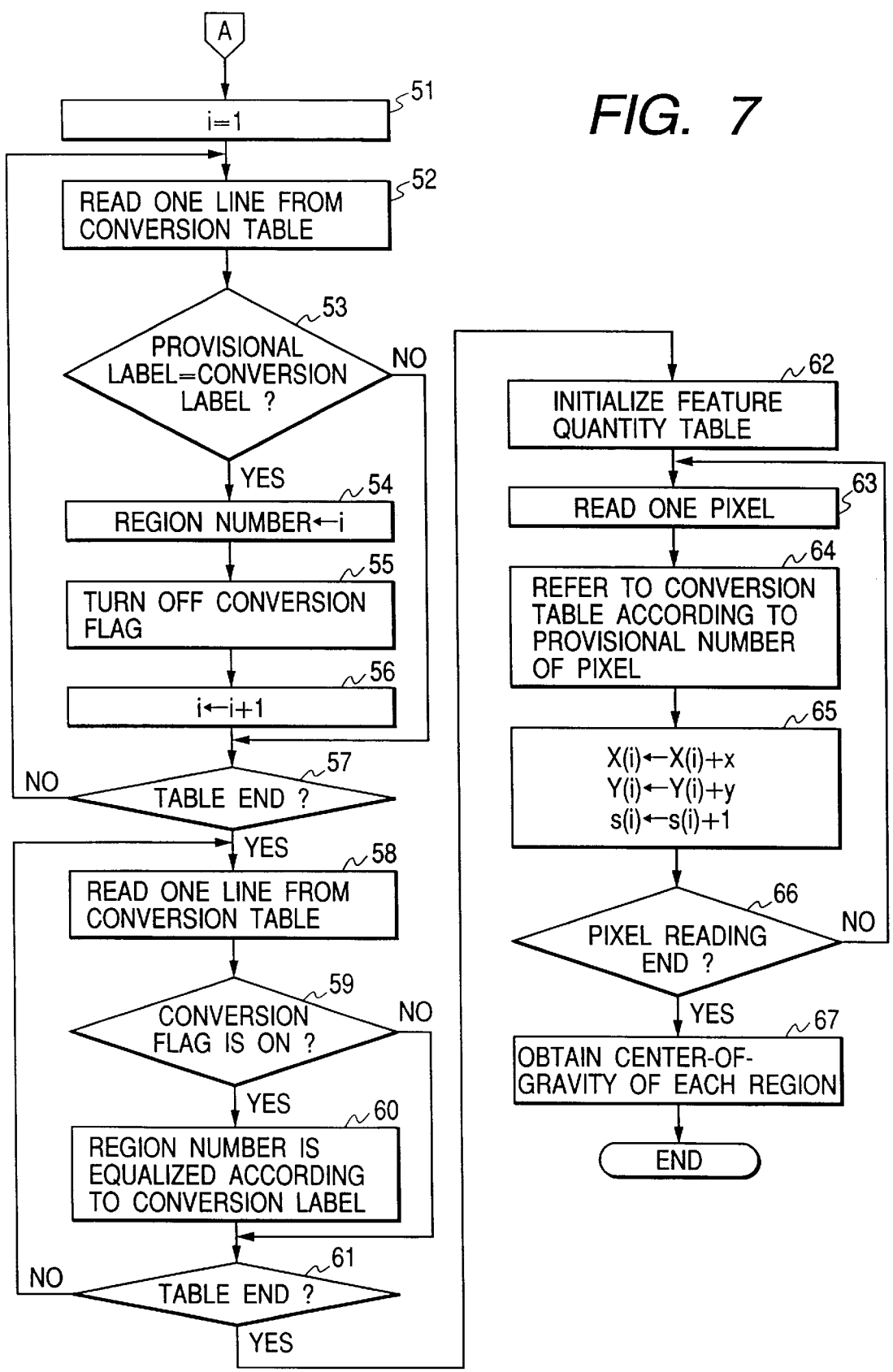

First, the labeling section 30 will be explained in greater detail with reference to FIGS. 6 to 8. FIG. 6 is a flowchart showing a provisional labeling procedure which is performed in the labeling section 30. FIG. 7 is a flowchart showing a label changing or renewing procedure. FIG. 8 is a feature quantity table in which the feature quantity of each labeled region is registered.

The provisional labeling procedure will be explained hereinafter in greater detail with reference to the flowchart of FIG. 6. Step 40 sets 1 as an initial value for the label "n" (i.e., n=1). Step 41 selects a first scanning position of the input image. Step 42 judges whether a labeled pixel is present in an already scanned region in the vicinity of the concerned pixel position within the window (i.e., pixels d2, d3, d4, and d5 shown in FIG. 4A). When the judgement result is "No" in the step 42, the control flow proceeds to step 43 in which a label "n" is put on the present scanning position. Subsequently, the control flow proceeds to step 44 in which the label "n" is renewed by 1 (i.e., n=n+1). Then, the control flow returns to step 41. When the judgement result is "Yes" in the step 42, the control flow proceeds to step 45 to judge whether all of peripheral pixels in the vicinity of the concerned pixel have the same labels. When the judgement result is "Yes" in step 45, the control flow proceeds to step 46 in which the same label as that of the peripheral pixels is put on the concerned pixel. Then, the control flow returns to step 41. When the judgement result is "No" in step 45, the control flow proceeds to step 47 in which the concerned pixel is put the oldest label (i.e., the label having a smallest number). Subsequently, the control flow proceeds to step 48.

The step 48 records the identity (i.e., coincidence in type) between different labels. For example, a pattern having branches may be changed into a pattern having no branches due to merging of the branches in accordance with the advancement of the scanning operation. In such a case, different labels will be put on the same pattern, although the same label should be put on. Thus, the relationship that these labels are same is recorded on a conversion table. The conversion table is a look-up table recording various items including the provisional label, a conversion flag, a conversion number, and a region number. To assign the same label number to all of the labels in the already scanned region, the conversion flag is turned on with respect to the label numbers of the pixels d0, d2, d3, d4 and d5. Converted label numbers are registered. Then, the control flow processes to step 49 to judge whether the scanning operation is finished. When the scanning operation is finished (i.e., "Yes" in step 49), the control flow proceeds to the flowchart of FIG. 7. When the judgement result is "No" in step 49, the control flow returns to the step 41. By repeating the above-described procedure, appropriate provisional labels are put to all of patterns contained in the image.

Next, the processing for rewriting the conversion table and obtaining the feature quantity of each pattern will be explained with reference to FIGS. 7 and 8. In the flowchart of FIG. 7, steps 51 to 61 show the procedure for rewriting the conversion table and steps 62 to 67 show the procedure for obtaining the feature quantity of each pattern.

First, step 51 sets 1 to the region number "i." Then, step 52 reads one line from the conversion table. Then, control flow proceeds to step 53 to judge whether the provisional label is identical with a conversion label. When the provisional label is equal to the conversion label (i.e., "Yes" in step 53), the control flow proceeds to step 54. When the judgement result is "No" in the step 53, the control flow returns to the step 52 via step 57 to read the next line from the conversion table. The step 54 assigns the number "i" as the region number. Then, step 55 turns off the conversion flag. Subsequently, step 56 increments the region number by 1 (i.e., i=i+1). The control flow then proceeds to step 57 to judge whether the conversion table is processed completely. When the processing for the conversion table is terminated ("Yes" in step 57), the control flow proceeds to step 58. When the judgement result is "No" in the step 57, the control flow returns to the step 52 to read the next line from the conversion table and repeat the procedure of the above-described steps 52 to 57.

Step 58 starts a label equalizing operation based on the conversion flag. Step 58 reads one line from the conversion table. Then, step 59 judges whether the conversion flag is turned on. When the conversion flag is turned on (i.e., "Yes" in step 59), the control flow proceeds to step 60. When the judgement result is "No" in the step 59, the control flow returns to the step 58 via step 61 to read the next line from the conversion table. Step 60 sets a region number of the present concerned label. The region number of the present concerned label is equalized with the region number of a number position identified by the conversion label. The above-described label equalizing operation is repeated until the conversion table is completely processed. Thus, the conversion table is converted into a table having continuous region numbers.

Step 62 starts the procedure for obtaining the feature quantity of each region. FIG. 8 shows a feature quantity table. Step 62 initializes (i.e., puts 0 to) each item in the feature quantity table. The feature quality of each pattern is obtained based on the image information assigned by the provisional label.

Step 63 reads one pixel. Then, step 64 checks the region number with reference to the conversion table based on the present provisional label number. Subsequently, step 65 adds the coordinate values of the present concerned pixel to the corresponding position on the feature quantity table.

$X(i)=X(i)+(x$ coordinate value of present concerned pixel)

$Y(i)=Y(i)+(y$ coordinate value of present concerned pixel)

where $X(i)$ and $Y(i)$ are coordinate values of the region number "i."

Then, the total number $s(i)$ is incremented by 1.

$s(i)=s(i)+1$

Then, the control flow proceeds to step 66 to judge whether the pixel reading operation is completed. When the pixel reading operation is completed (i.e., "Yes" in step 66), the control flows proceeds to step 67. When the judgement result is "No" in the step 66, the control flow returns to the step 63 to read the next pixel and repeat the processing of the steps 63 to 66.

Step 67 calculates a center of gravity whose coordinate values are represented by $X(i)/s(i)$ and $Y(i)/s(i)$. The center of gravity is obtained with respect to every region of the feature quantity table shown in FIG. 8. The obtained center-of-gravity position is written as $xg(i)$ and $yg(i)$ in the feature quantity table of FIG. 8. As a result, the above-described procedure obtains the feature quantity of each connected pattern in the input image, i.e., an area and a center-of-gravity position.

According to the first embodiment of the present invention, the feature quantity is represented in terms of the area of each pattern. However, it is possible to replace the area by a peripheral length or a circumscribed rectangle of the pattern, as long as the obtained feature quantity can be used in the judgement performed in the succeeding candidate region judging section 31.

Each bar constituting a bar code is a convex figure having no branches. Thus, utilizing such characteristics, it is possible to omit the processing of steps 51 to 61 and the processing of steps 62 to 67 can be applied to only limited regions corresponding to the numbers whose conversion flag is turned off in the conversion table.

Figure 9:
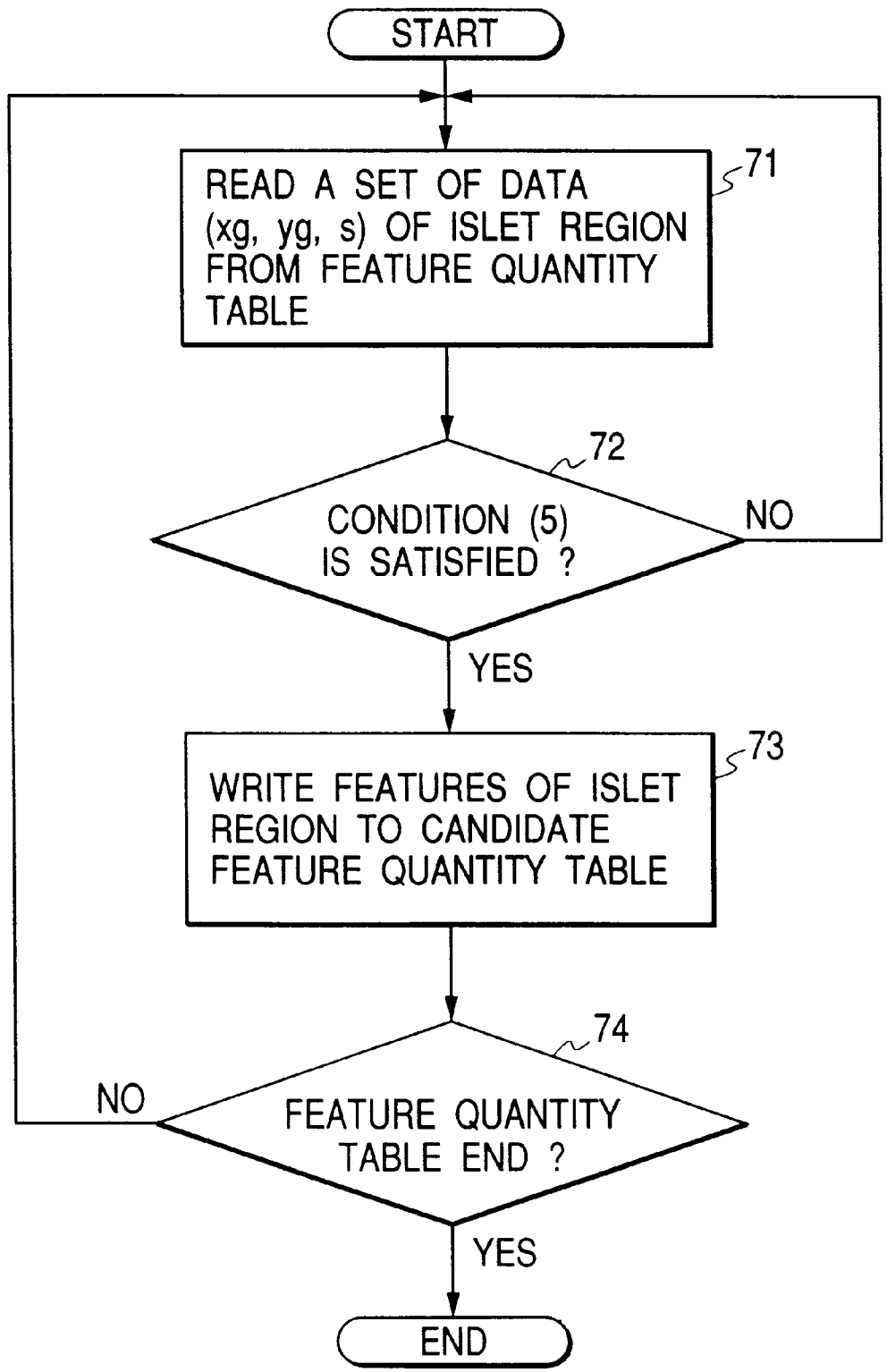
FIG. 9 is a flowchart showing a procedure performed by a candidate region judging section in the region detecting section of the bar code image processing apparatus in accordance with the first embodiment of the present invention.

Next, the candidate region judging section 31 will be explained with reference to FIG. 9. FIG. 9 is a flowchart showing details of a processing procedure performed in the candidate region judging section 31.

In FIG. 9, step 71 reads the feature quantity of one islet region from the feature quantity table. The feature quantity is a set of the center-of-gravity coordinates (xg, yg) and the area "s." Next, step 72 judges whether the area "s" satisfies the following condition (5) which is provided to judge the bar code candidate region.

$$(H1 \cdot 1B - ds1) \leq s \leq (H1 \cdot 1B + ds1) \tag{5}$$

where 1B represents the length of a bar code region, H1 represents the height of a long bar, and ds1 represents a tolerance.

When the condition (5) is not satisfied (i.e., "No" in step 72), the control flow returns to step 71 to read the feature quantity of the next islet region from the feature quantity table. When the judgement result is "Yes" in the step 72, the control flow proceeds to step 73.

Step 73 writes the feature quantity of the present islet region to a candidate feature quantity table which is prepared beforehand and has the same format as the feature quantity table shown in FIG. 8.

Next, step 74 judges whether all data of the feature quantity table are processed. When the processing for the all data of the feature quantity table is not completely terminated (i.e., "No" in the step 74), the control flow returns to the step 71 to read the feature quantity of the next islet region from the feature quantity table and repeat the processing of the steps 71 to 74. When the judgement result is "Yes" in the step 74, the processing is terminated. Through the above-described processing, a bar code candidate region is detected.

Figure 10:
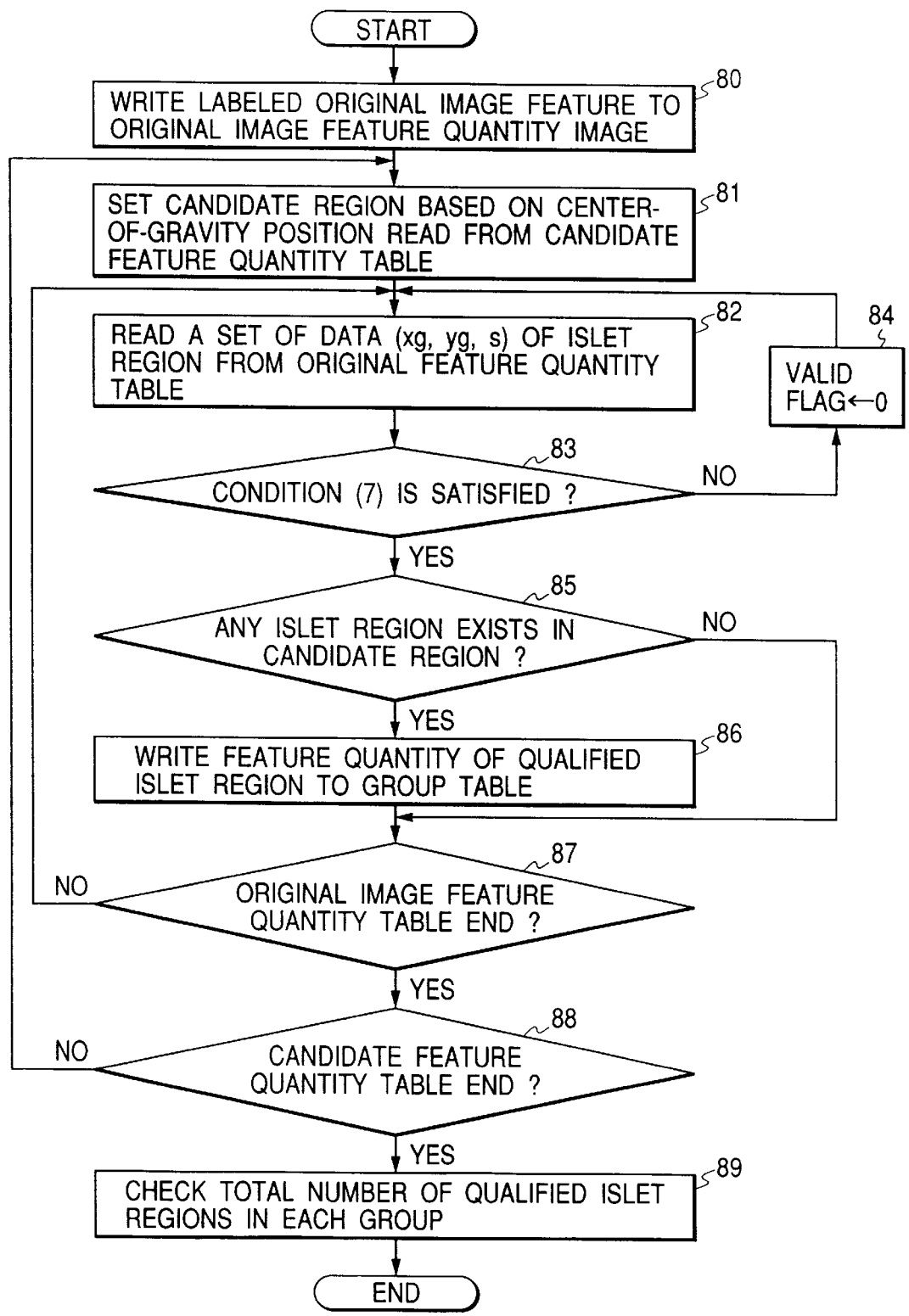
FIG. 10 is a flowchart showing a grouping procedure performed by a decoding section of the bar code image processing apparatus in accordance with the first embodiment of the present invention.

Next, the decoding section 8 will be explained. FIG. 10 is a flowchart showing details of a grouping procedure performed in the decoding section 8. Namely, the decoding section 8 makes a group of bars involved in a bar code candidate region. FIG. 11 is an original image feature quantity table which describes the feature quantity of each islet region obtained based on the binary image memorized in the image memory section 2. FIG. 12 is a group table which is referred to in the grouping processing. The group table is defined as a structural body "gr."

In the flowchart of FIG. 10, step 80 performs the labeling processing of an original image supplied from the image memory section 2 to detect the feature quantity (xg, yg, s) of each islet region of the original image. The detected feature quantity (xg, yg, s) of each islet region is written into the original image feature quantity table shown in FIG. 11. The labeling processing performed in the step 80 is substantially identical with the processing performed by the labeling section 30. The original image feature quantity table includes a valid flag which is 1 in an initial condition.

Step 81 reads a center-of-gravity position of one feature quantity listed in the candidate feature quantity table obtained by the region detecting section 7, and sets a rectangular bar code candidate region whose center is positioned on the center-of-gravity position. More specifically, to define the rectangular bar code candidate region, both the minimum coordinates (xbmin, ybmin) and the maximum coordinates (xbmax, ybmax) are determined according to the following equations (6).

$$xbmin = xbg - 1B/2;$$

$$ybmin = ybg - 1B/2;$$

$$xbmax = xbg + 1B/2; \text{ and}$$

$$ybmax = ybg + 1B/2 \tag{6}$$

where (xbg, ybg) denotes the coordinate values representing the center-of-gravity position of the candidate region.

Step 82 reads the feature quantity of each islet region from the original image feature quantity table. The feature quantity read in the step 82 includes one set of the center-of-gravity coordinates (xg, yg) and the area "s" of an islet region whose valid flag is 1. Subsequently, step 83 judges whether the area "s" satisfies the following condition (7) which is used to identify a bar type among the long bar, the sem-long bar and the timing bar.

$$Long\ bar:(1-t1) \cdot H1 \cdot W1 \leq s \leq (1+t1) \cdot H1 \cdot W1;\ or$$

$$Semi\text{-}long\ bar:(1-t1) \cdot H2 \cdot W1 \leq s \leq (1+t1) \cdot H2 \cdot W1;\ or$$

$$Timing\ bar:(1-t1) \cdot H3 \cdot W1 \leq s \leq (1+t1) \cdot H3 \cdot W1 \tag{7}$$

where t1 is a tolerance.

When all of condition (7) are not satisfied (i.e., "No" in the step 83), the control flow returns to the step 82 via a step 84 in which the valid flag of the judged islet region is changed from 1 to 0 and registered in the original image feature quantity table. When any one of the condition (7) is satisfied (i.e., "Yes" in the step 83), the control flow proceeds to step 85.

Step 85 judges whether any islet region exists in the candidate region set in the step 81, using the following condition (8).

$$xbmin \leq xg \leq xbmax;\ \text{and}$$

$$ybmin \leq yg \leq ybmax \tag{8}$$

When the condition (8) is satisfied (i.e., "Yes" in the step 85), the control flow proceeds to step 86 in which the feature quantity of this qualified islet region is register in the group table. More specifically, the (x,y) coordinate values of the center-of-gravity position, an area, and a bar type of the qualified islet region are registered in x[i], y[i], s[i] and bar[i], where i=0 to "member," respectively. In this case, "member" represents a total number of the islet regions qualified through the judgement of step 85. Regarding the bar type, 1 is assigned to the long bar, 2 is assigned to the semi-long bar, and 3 is assigned to the timing bar. Upon finishing the registration for the present qualified islet region, the "member" is incremented by 1.

After finishing the step 86, or when the judgement result is "No" in the step 85, the control flow proceeds to step 87. Step 87 judges whether all of data in the original image feature quantity are processed completely. When the judgement result is "No" in the step 87, the control flow returns to the step 82 to read the feature quantity of the next islet region from the original image feature quantity table. When the judgement result is "Yes" in the step 87, the control flow proceeds to the step 88. Step 88 judges whether all of data in the candidate feature quantity table are processed completely. When the judgement result is "No" in the step 88, the control flow returns to the step 81 to read a center-of-gravity position of the next feature quantity listed in the candidate feature quantity table. When the judgement result is "Yes" in the step 88, the control flow proceeds to step 89. Step 89 checks the total number of the qualified islet regions of each group which are produced by the above-described processing to judge whether each group is a bar code candidate region. It is assumed that N represents a total number of bars in a bar code. When the "member" is equal to or larger than N, a candidate flag "bar_flag" of this group is set to 1, otherwise set to 0. Accordingly, through the above-described processing, it becomes possible to detect the center-of-gravity position and the type of each bar involved in the bar code candidate region.

Figure 13:
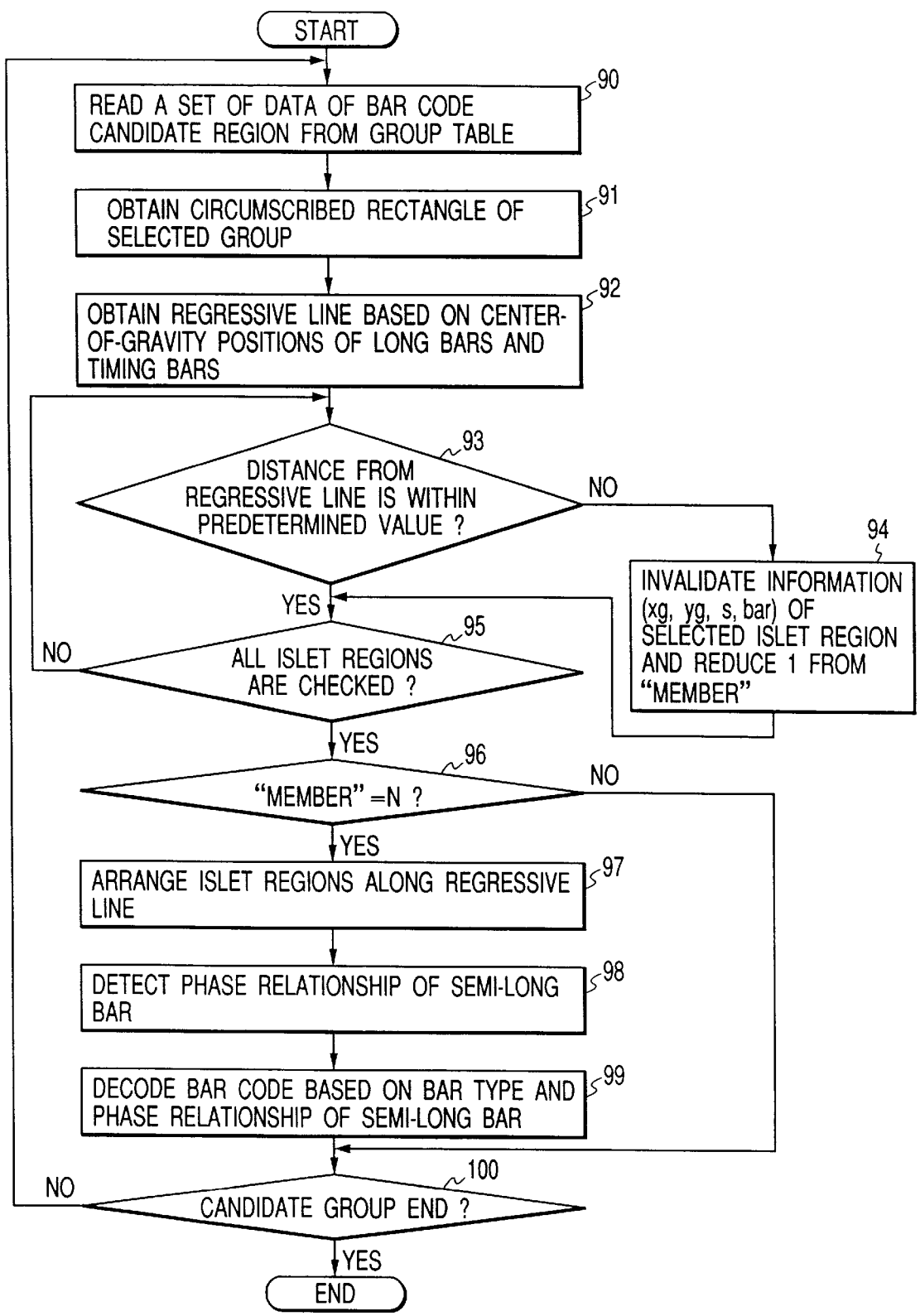
FIG. 13 is a flowchart showing a decoding procedure performed by the decoding section of the bar code image processing apparatus in accordance with the first embodiment of the present invention.
Figure 14:
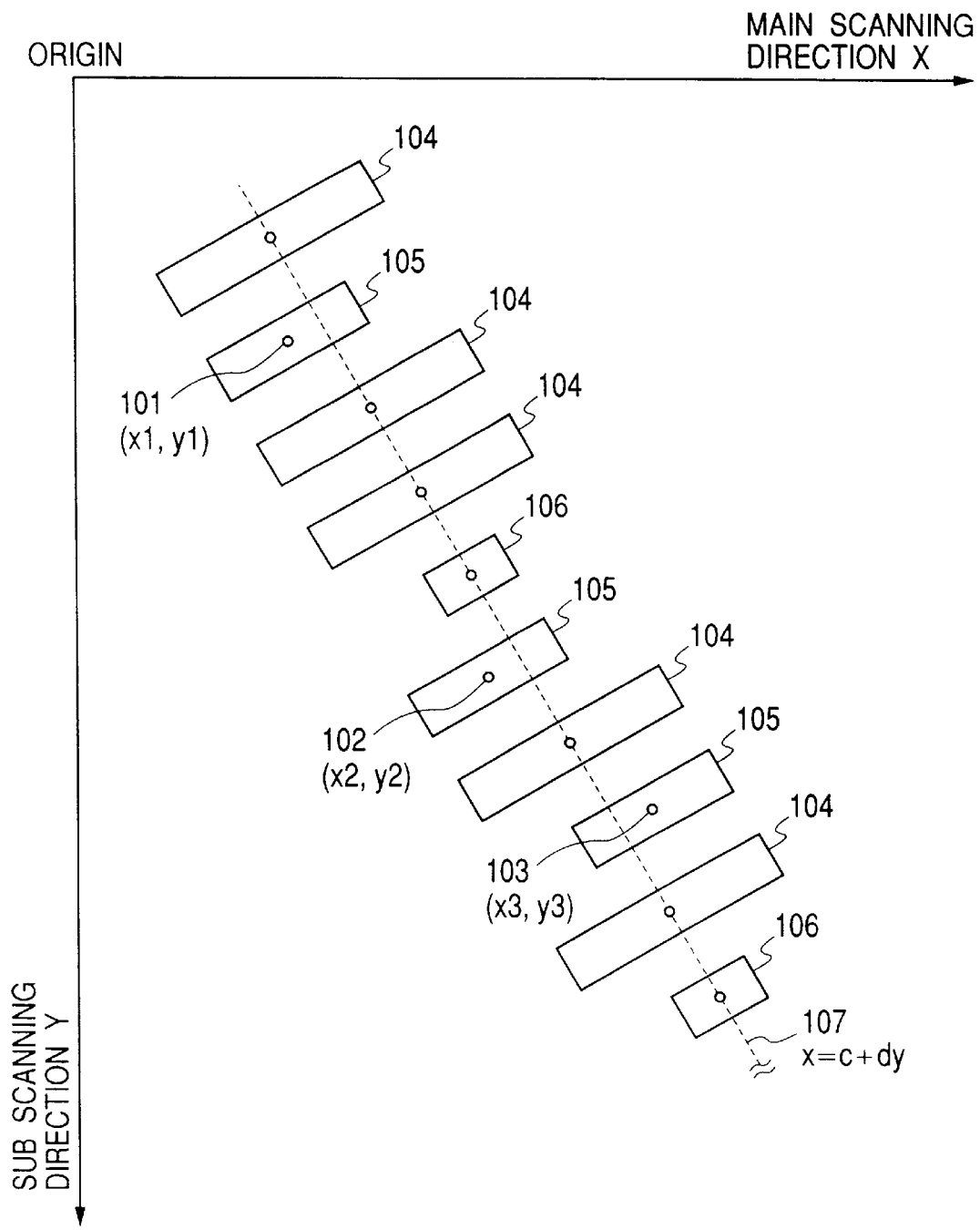
FIG. 14 is a view showing a practical arrangement of a bar code, which is detected by the decoding section of the bar code image processing apparatus in accordance with the first embodiment of the present invention.

Next, a decoding procedure performed in the decoding section 8 will be explained with reference to FIGS. 13 and 14. FIG. 13 is a flowchart showing details of the bar code decoding procedure. FIG. 14 is a view showing a phase relationship of the semi-long bar with respect to the center line of the bar code.

In the flowchart of FIG. 13, step 90 reads the data of a bar code candidate region from the group table, when the candidate flag of this candidate region is set to 1. Step 91 obtains a minimum circumscribed rectangle enclosing all islet regions belonging to this group based on the center-of-gravity coordinates of the islet regions. The minimum circumscribed rectangle is defined by a minimum value (xmin) and a maximum value (xmax) among the x coordinates of all of the islet regions, as well as a minimum value (ymin) and a maximum value (ymax) among the y coordinates of all of the islet regions. In other words, the minimum circumscribed rectangle is a rectangle whose four corners are positioned at coordinates (xmin, ymin), (xmax, ymin), (xmin, ymax), and (xmax, ymax).

When the circumscribed rectangle has an x-directional side longer than its y-directional side, an angle between the center line of the bar code and the x axis is within ±45°. On the other hand, when the circumscribed rectangle has an x-directional side shorter than its y-directional side, an angle between the center line of the bar code and the y axis is within ±45°.

Step 92 obtains a regressive straight line passing the center-of-gravity points of the long bars and the timing bars judged by the grouping procedure. The regressive straight line is expressed by an equation y=a+bx, when the angle between the center line of the bar code and the x axis is within ±45°. Constants "a" and "b" in this equation are obtained by the following equations (9).

$$b = \frac{n \cdot \Sigma x \cdot y - \Sigma x \cdot \Sigma y}{n \cdot \Sigma x^2 - (\Sigma x)^2} \quad (9)$$

and $$= \frac{\Sigma x^2 \cdot \Sigma y - \Sigma x \cdot \Sigma x \cdot}{n \cdot \Sigma x^2 - (\Sigma x)^2}$$

where n is the total number of the long bars and the timing bars.

On the other hand, the regressive straight line is expressed by an equation x=c+dy, when the angle between the center line of the bar code and the y axis is within ±45°. Constants "c" and "d" in this equation are obtained by the following equations (10).

$$d = \frac{n \cdot \Sigma x \cdot y - \Sigma x \cdot \Sigma y}{n \cdot \Sigma y^2 - (\Sigma y)^2} \quad (10)$$

and $$= \frac{\Sigma x \cdot \Sigma y^2 - \Sigma y \cdot \Sigma x \cdot}{n \cdot \Sigma y^2 - (\Sigma y)^2}$$

Next, the control flow proceeds to step 93 to calculate a distance between the center-of-gravity position of each islet region and the circumscribed straight line. Then, step 93 judges whether the calculated distance is within a predetermined value δ. When the calculated distance exceeds the predetermined value δ (i.e., "No" in the step 93), the control flow proceeds to step 94. When the judgement result is "Yes" in the step 93, the control flow proceeds to step 95. In this case, the distance from a point (x, y) to a line is calculated in the following manner. When the angle between the center line and the x axis is within ±45°, the distance is calculated according to the following equation (11) which corresponds to the equation (9).

$$\frac{|y - a - b \cdot x|}{\sqrt{1 + b^2}} \quad (11)$$

When the angle between the center line and the y axis is within ±45°, the distance is calculated according to the following equation (12) which corresponds to the equation (10).

$$\frac{|x - c - d \cdot y|}{\sqrt{1 + d^2}} \quad (12)$$

Step 94 invalidates the information of the corresponding islet region. The values in the items {x, y, s, bar} of the group table are invalidated (i.e., replaced by −1) and the total number of the islet regions, i.e., "member", is reduced by 1. After completing the step 94, the control flow proceeds to the step 95. Step 95 checks whether all of the islet regions are checked regarding the judgement of step 93. When the check of all islet regions is entirely finished (i.e., "Yes" in the step 95), the control flow proceeds to step 96. When the judgement result is "No" in the step 95, the control flow returns to the step 93. Step 96 judges whether the total number "member" of the islet regions is identical with the total number (N) of the bars involved in a bar code (i.e., "member"=N?). When the coincidence is recognized (i.e., "Yes" in the step 96), the control flow proceeds to step 97. When the judgement result is "No" in the step 96, it is concluded that this group is not a bar code. Thus, the control flow proceeds to step 100.

Step 97 arranges the islet regions along the circumscribed straight line. This arrangement is a preparation for the decode operation of a detected bar code performed in a later-described step 99. More specifically, when the angle between the center line and the x axis is within ±45°, they are sorted in accordance with their x coordinate values. When the angle between the center line and the y axis is within ±45°, they are sorted in accordance with their y coordinate values.

Next, step 98 detects a phase relationship of each semi-long bar with respect to the center line of the bar code. FIG. 14 shows the detailed example of the bar code including long bars 104, semi-long bars 105, and timing bars 106.

According to the bar code arrangement shown in FIG. 14, the angle between the center line 107 (x=c+dy) and the y axis is within ±45°. There are three semi-long bars 105 having their center-of-gravities on the points 101(x1, y1), 102 (x2, y2) and 103 (x3, y3). In this case, x1<c+dy1, x2<c+dy2, and x3>c+dy3. In other words, the center-of-gravity positions 101 and 102 are located at a negative side with respect to the center line 107. The center-of-gravity position 103 is located at a positive side with respect to the center line 107.

Subsequently, step 99 searches or retrieves each islet region of this group one by one. Each islet region is converted into a corresponding bar in accordance with the bar type and the semi-long bar's phase relationship with respect to the regressive straight line. Although not shown, a code conversion table is referred to in this conversion processing. By processing all of the islet regions belonging to the same group, a decoding of the detected bar code is accomplished.

Thereafter, the control flow proceeds to the step 100 to check whether all of the candidate groups have been processed. When the judgement result is "No" in the step 100, the control flow returns to the step 90 to read the data of the next bar code candidate region from the group table and repeat the above-described processing. When the judgement result is "Yes" in the step 100, this routine is terminated.

According to the above-described first embodiment of the present invention, the used bar code is a 4-state code including a long bar, a semi-long bar and a timing bar. Needless to say, the 4-state code can be replaced by a JAN code which is widely used. When the JAN code is used, the step 72 shown in FIG. 9 will be modified so as to discriminate the thickness (thick or narrow) of each bar based on the area judgement. Furthermore, the step 98 shown in FIG. 13 will be modified so as to detect a distance between islet regions to detect a relationship between a bar and a space, instead of detecting the phase relationship.

The bar code decoded from the decoding section 8 is output from the output terminal 9. The bar code thus decoded is generally used in a mail sorting machine, a cargo classification system, or a register used in a supermarket.

Second Embodiment

Figure 15:
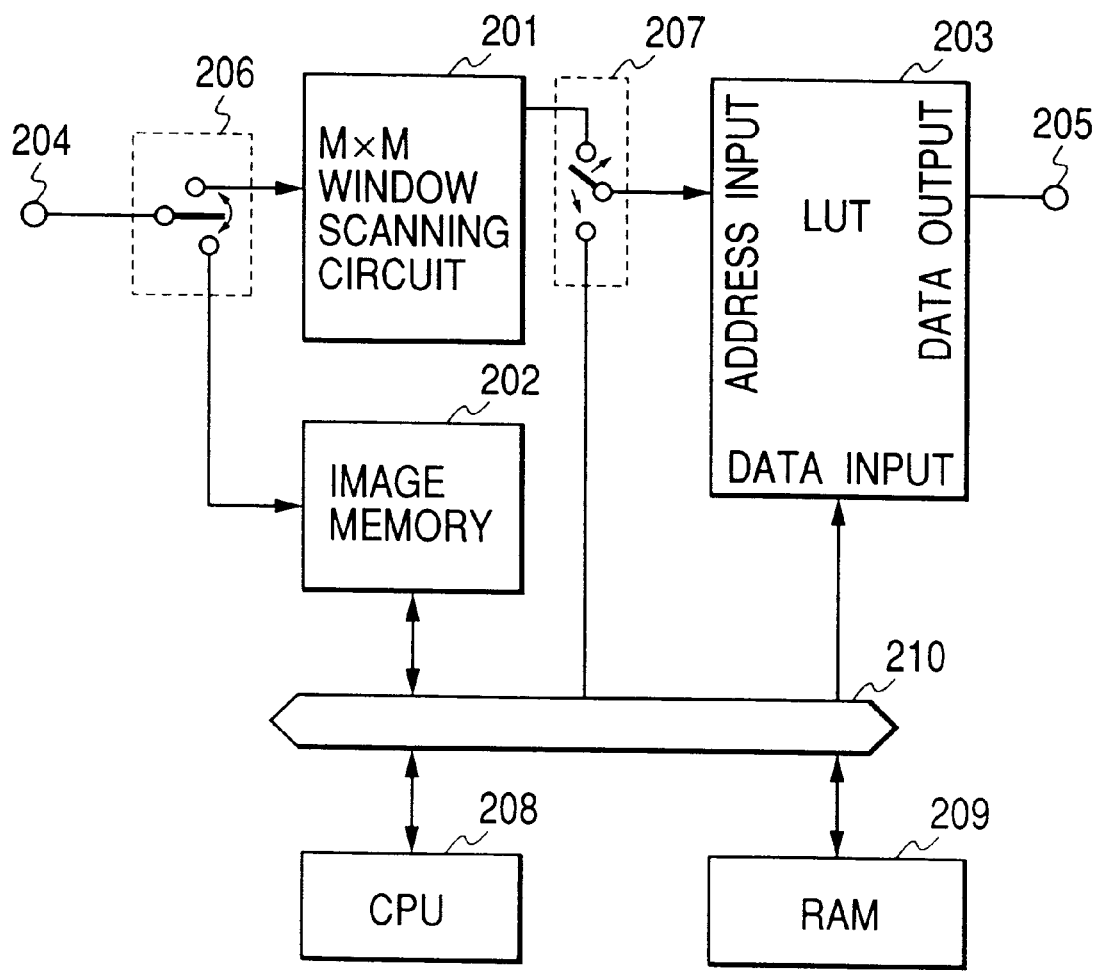
FIG. 15 is a block diagram showing an arrangement of an M×M pixel mask judging section of a bar code image processing apparatus in accordance with a second embodiment of the present invention.
Figure 16:
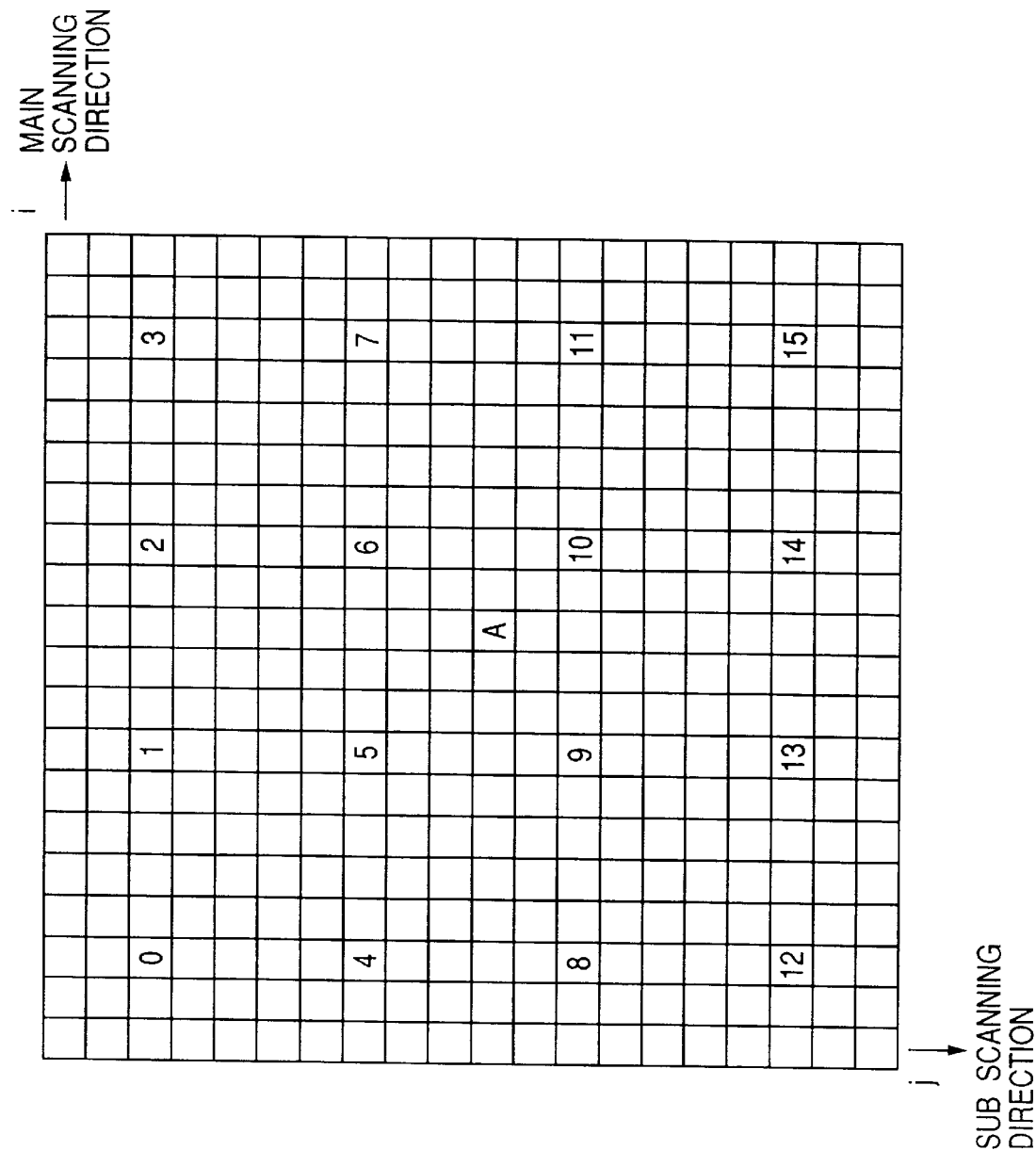
FIG. 16 is a view showing an M×M pixel scanning window used in the bar code image processing apparatus in accordance with the second embodiment of the present invention.
Figure 17:
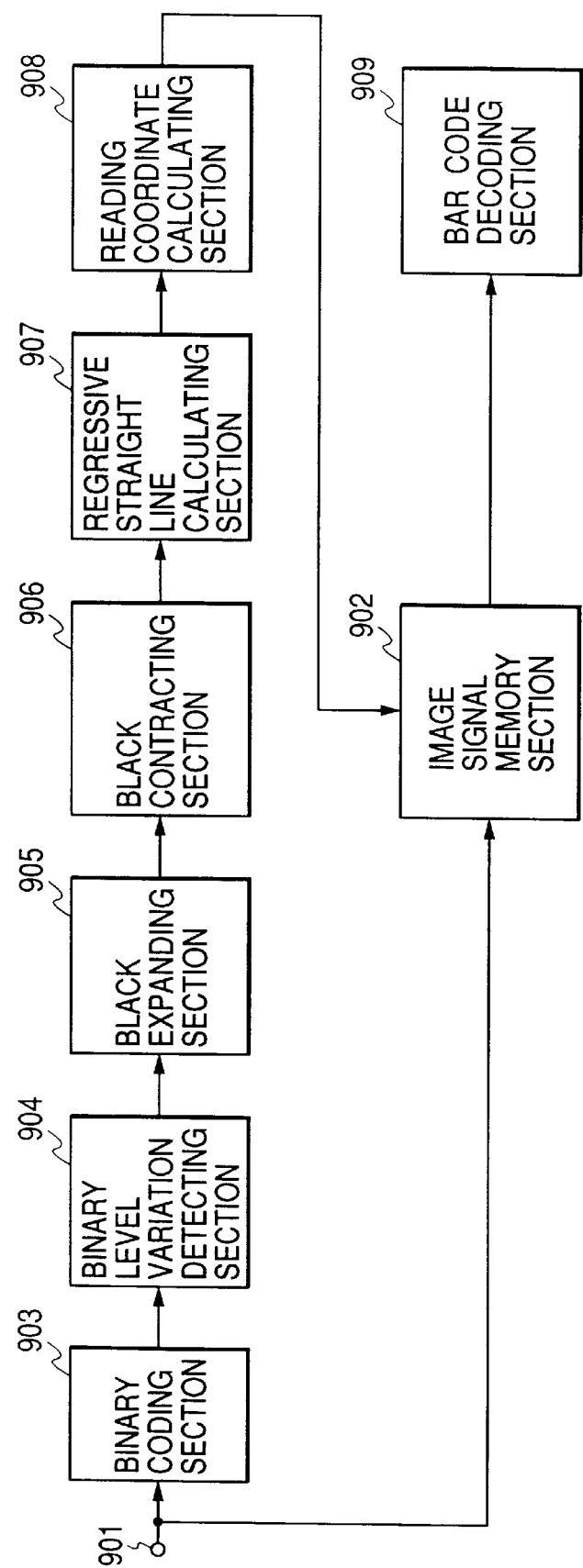
FIG. 17 is a block diagram showing a conventional bar code image processing apparatus.

A second embodiment of the present invention will be explained with reference to FIGS. 15 and 16. FIG. 15 is a block diagram showing an M×M mask judging section in the bar code image processing apparatus in accordance with the second embodiment of the present invention.

In FIG. 15, numeral 201 represents an M×M pixel window scanning circuit which performs a scanning operation when a binary image is entered. Numeral 202 represents an image memory which memorizes the entered binary image. Numeral 203 represents LUT (look-up table) which generates 1-bit output data of 1 or 0 based on an m-bit address. Numeral 204 represents an input terminal through which a binary image is entered from the image input section 1. Numeral 205 represents an output terminal through which the binary image is sent to the small pattern removing section 4. A switching circuit 206 is connected to the input terminal 204 to selectively supply the entered binary image to the M×M pixel window scanning circuit 201 or to the image memory 202. An address selecting circuit 207 is connected to an address input terminal of the LUT 203 for selectively inputting an address from the M×M pixel window scanning circuit 201 or a bus 210 which is connected to the image memory 202, CPU 208 and RAM 209.

An operation of the above-described M×M mask judging section will be explained. First, a learning mode will be explained. The learning mode is provided for registering various patterns of a sample image to LUT 203. The sample image is scanned pixel by pixel by using an M×M pixel window along scanning lines of various angles. The patterns, appearing in the M×M pixel window during this scanning operation, are registered in the LUT 203. More specifically, m pixels are selected from the M×M pixel region. An output value 1 is registered to a position having this m-bit address.

According to the second embodiment of the present invention, M=20 and m=16. Thus, a 16-bit address is entered into the LUT 203. FIG. 16 shows a detailed arrangement of the M×M pixel window. A concerned pixel "A" is located at the center of this M×M pixel window. The M×M pixel window is dissected into 16 blocks by equally dividing each of vertical and lateral sides into four. Each block consists of 5×5 pixels. The central pixel of each block is selected as a representative of each block. FIG. 16 shows the selected representative pixels 0 through 15. The values of the representative pixels 0 through 15 are arranged from LSB to MSB to produce a 16-bit address.

Hereinafter, a LUT pattern registering procedure will be explained. The address selecting circuit 207 connects its movable contact to the bus 210 so that an address is entered from CPU 208 to the address input terminal of LUT 203. All data of LUT 203 are initialized to 0. Next, the switching circuit 206 connects its movable contact to the image memory 202. A sample image, which only includes an objective bar code, is entered from the input terminal 204. CPU 208 performs a raster scanning operation one pixel by one pixel on the bar code image stored in the image memory 202. Through this raster scanning operation, a 24×24 pixel region having the center on the concerned pixel "A" is cut out of the bar code image. The 24×24 pixel region is developed in RAM 209. In this case, an address consisting of the bit pattern of the representative pixels 0 through 15 is entered into the LUT 203. In response to the input address, LUT 203 writes 1 to a corresponding address.

Subsequently, the 24×24 pixel region developed on the RAM 209 is rotated 5° about the concerned pixel "A." Then, an address consisting of the bit pattern of the representative pixels 0 to 15 obtained at the 5° rotated position is entered into the LUT 203. In response to this input address, LUT 203 writes 1 to a corresponding address. The same operation is repeated until the 24×24 pixel region rotates 360° about the concerned pixel "A". In the same manner, the bit pattern appearing in accordance with each 5° rotation of the 24×24 pixel region about the concerned pixel "A" is registered into LUT 203.

Next the image memory 202 is accessed again to cut out another 24×24 pixel region having the center on the next concerned pixel. Then, the above-described registering operation is performed. The above-described processing is repeated until the scanning operation of the bar code stored in the image memory 202 is completed.

According to the above-described procedure, LUT 203 registers all the bit patterns appearing on the representative pixels 0 through 15 when the bar code is seen from a local position in all directions.

Next, a bar code detecting operation will be explained. Each bar code region involved in the document image is detected with reference to LUT 203. The address selecting circuit 207 connects its movable contact to the M×M pixel window scanning circuit 201. The switching circuit 206 connects its movable contact to the M×M pixel window scanning circuit 201. Thus, the binary image of the image input section 1 is entered into the M×M pixel window scanning circuit 201. The M×M pixel window scanning circuit 201 has a structure similar to the above-described learning mode shown in FIG. 16. The values of the representative pixels 0 through 15 are arranged from LSB to MSB to produce a 16-bit address. The produced 16-bit address is sent to LUT 203 via the address selecting circuit 207. The data, read out from LUT 203 in this case, corresponds to the position "A" and output from the output terminal 205.

Accordingly, the second embodiment of the present invention is characterized in that LUT registers many patterns in advance. The registered patterns are ones appearing in the M×M pixel region when an objective bar code is scanned along scanning lines of arbitrary angles. Thus, it becomes possible to detect a bar code accurately regardless of the position or direction of the bar code in the document image.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A bar code image processing apparatus comprising:

image input means for entering a document image including a bar code and converting said document image into a binary image;

image memory means for memorizing the binary image supplied from said image input means;

mask judging means for performing a scanning operation using an M×M pixel window along a plurality of scanning lines angularly arranged at regular intervals of (360/m)° about a center pixel of said M×M pixel window for detecting an alternate pattern from the binary image supplied from said image input means, said mask judging means further producing a bar code detecting signal when any alternate pattern is detected during the scanning operation, and said mask judging means further determining an output value by entering an address including predetermined pixels within said M×M pixel window into a look-up table means which registers all of bit patterns appearing on said predetermined pixels when an objective bar code is scanned pixel by pixel;

small pattern removing means for removing small patterns from a binary image sent from said mask judging means;

expanding means for expanding a pattern involved in a binary image sent from said small pattern removing means by an amount equivalent to k1 pixels;

contracting means for contracting a pattern involved in a binary image sent from said expanding means by an amount equivalent to k2 pixels;

region detecting means for obtaining the feature quantity of each pattern involved in a binary image sent from said contracting means, and detecting a bar code candidate region based on the detected feature quantity; and decoding means for decoding a bar code by reading a specific image region from said image memory means when said specific image region corresponds to said bar code candidate region detected by said region detecting means.

2. The bar code image processing apparatus in accordance with claim 1, wherein said region detecting means detects said bar code candidate region based on the feature quantity including an area, a peripheral length, or a circumscribed rectangle.

3. The bar code image processing apparatus in accordance with claim 1, wherein said decoding means performs a decoding operation based on an area and a center-of-gravity position of each bar.

4. The bar code image processing apparatus in accordance with claim 1, wherein said bar code is a 4-state code including a long bar, a semi-long bar and a timing bar.

5. The bar code image processing apparatus in accordance with claim 4, wherein said decoding means discriminates each pattern by putting a label, identifies a bar type among said long bar, said semi-long bar and said timing bar based on an area of each pattern, obtains a line passing center-of-gravity positions of said long and timing bars, detects a phase relationship of said semi-long bar with respect to said obtained line, and decodes the bar code based on the obtained phase relationship.

6. A bar code image processing apparatus comprising:

image input means for entering a document image including a bar code and converting said document image into a binary image;

image memory means for memorizing the binary image supplied from said image input means;

mask judging means for performing a scanning operation using an M×M pixel window for detecting an alternate pattern from the binary image supplied from said image input means;

small pattern removing means for removing small patterns from a binary image sent from said mask judging means;

expanding means for expanding a pattern involved in a binary image sent from said small pattern removing means by an amount equivalent to k1 pixels;

contracting means for contracting a pattern involved in a binary image sent from said expanding means by an amount equivalent to k2 pixels;

region detecting means for obtaining the feature quantity of each pattern involved in a binary image sent from said contracting means, and detecting a bar code candidate region based on the detected feature quantity; and decoding means for decoding a bar code by reading a specific image region from said image memory means when said specific image region corresponds to said bar code candidate region detected by said region detecting means, wherein said mask judging means produces a bar code detecting signal when any alternate pattern is detected during a scanning operation performed along a plurality of scanning lines angularly arranged at regular intervals of (360/m)° about a center pixel of said M×M pixel window.

* * * * *

UNITED STATES PATENT AND TRADEMARK OFFICE
CERTIFICATE OF CORRECTION

PATENT NO. : 6,070,800
DATED : June 6, 2000
INVENTOR(S) : MIKIO FUJITA

It is certified that error appears in the above-identified patent and that said Letters Patent is hereby corrected as shown below:

On the title page, item [75], Inventor's name: KUNIO YOSHIDA

Signed and Sealed this

Ninth Day of January, 2001

Attest:

Q. TODD DICKINSON

*Attesting Officer*  *Commissioner of Patents and Trademarks*